March 22, 1960     I. WILLIAMS     2,929,240

APPARATUS FOR TESTING MATERIALS FOR WEAR RESISTANCE

Filed May 16, 1957     2 Sheets-Sheet 1

*INVENTOR.*
IRA WILLIAMS
BY
Pollard, Johnston, Smythe + Robertson
*ATTORNEYS.*

March 22, 1960     I. WILLIAMS     2,929,240
APPARATUS FOR TESTING MATERIALS FOR WEAR RESISTANCE
Filed May 16, 1957     2 Sheets-Sheet 2

INVENTOR.
IRA WILLIAMS
BY
Pollard, Johnston, Smythe + Robertson
ATTORNEYS.

United States Patent Office 2,929,240
Patented Mar. 22, 1960

2,929,240

APPARATUS FOR TESTING MATERIALS FOR WEAR RESISTANCE

Ira Williams, Borger, Tex., assignor to J. M. Huber Corporation, Borger, Tex., a corporation of New Jersey Application May 16, 1957, Serial No. 659,567

6 Claims. (Cl. 73—7)

This invention relates to new and useful improvements in apparatus for testing materials for wear resistance, and more particularly to an improved apparatus whereby materials such as rubber or plastics may be accurately tested for their ability to resist wear or abrasion.

A machine for testing the wear resistance of such materials is disclosed in U.S. Patent No. 1,711,866 to Ira Williams. This known machine makes use of an abrasive wheel or disc rotated on a horizontal axis. A support acting as a lever is movable on the axis of the disc and serves to hold samples of the material to be tested in contact with the abrasive surface of the disc. The samples are pressed against the abrasive surface by a weight which pulls the support toward the disc. The rotation of the abrasive against the samples then tends to rotate the support, and the torque thus created is resisted by a load which is applied to a lever arm extending horizontally to one side of the sample support. When the applied load balances the torque on the lever arm, the magnitude of the load becomes a measure of the work or power expended on the samples.

By subjecting samples of different materials to equivalent amounts of work on a machine of that character and determining the loss of weight from each sample, comparable indications of the abrasion or wear resistance of the materials may be obtained.

In the use of the known abrasion testing machines, however, certain errors or irregularities still occur which limit the accuracy of the indications obtained for different test materials. The object of this invention is to provide improvements of such machines which serve to increase the accuracy and reliability of the test indications.

It has been found that much of the inaccuracy occurring in the indications of known testing machines is attributable to the fact that the various samples or test pieces are not abraded in an identical manner, due to uneven action of the abrasive on the contacting surface of each sample. The abrasive constantly scrubs the surface of the sample in one direction, thus cutting furrows in the surface of the sample and causing a feathering of the following edge of the sample with the formation of a dished-out area near the following edge. In addition, since the travel of the abrasive against a point on the surface of the sample is proportional to the distance of that point from the axis of rotation of the abrasive, the edge of the sample farther from the axis receives more wear than the nearer edge.

According to one important feature of this invention, that source of irregularities is obviated by constructing the testing apparatus so that each sample or test piece is rotated about an axis of its own lying transverse to the rotating abrasive surface, while the sample is held against the abrasive surface and thus abraded or worn off to obtain a measure of its wear resistance. More particularly, the sample is rotated at the same angular velocity, or number of revolutions, as the abrasive surface. In this way, as can be demonstrated mathematically, all parts of the contacting surface of the sample can be assured of receiving the same amount of abrasion in a given period of operation of the testing apparatus.

Another source of error exists in the use of the known machine described hereinabove, in that the machine does not maintain a constant rate of work on the various test pieces. Changes in the quality of the materials under test or in the condition of the abrasive surface bring variations in the rate of expenditure of work on the test pieces. These are reflected in variations of the torque exerted by the support which holds the test pieces. Although the torque variations may be compensated by varying the load applied to the lever arm, this complicates the calculation of the amount of work expended on each test piece and leads to errors in the comparisons of different test pieces.

According to another feature of this invention, the problem last mentioned is overcome by providing the testing apparatus with means which function automatically to maintain a predetermined rate of expenditure of power or work in the abrading operations, so that a substantially constant amount of work will be expended on each test piece in a given period of time. More particularly, a predetermined load corresponding to the desired rate of work on the test pieces is applied to resist the torque of the support which holds the test pieces against the rotating abrasive surface, and the support is connected with means which operate to vary the pressure of the test pieces against that surface in response to angular displacements of the support. In this way the abrading torque can be kept substantially balanced at all times by the predetermined load, and this load becomes a direct measure of the work done on the samples.

The above-mentioned and other objects, features and advantages of this invention will become more apparent from the following detailed description of an illustrative embodiment of the invention. The detailed description refers to the accompanying drawings which form a part hereof, and in which.

Figure 1:
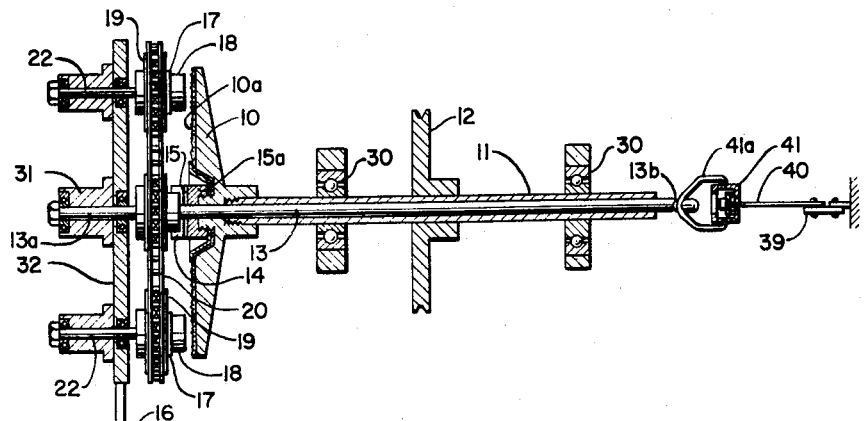
Fig. 1 is a diagrammatic plan view, partly in horizontal cross-section, of an assembly of principal elements of the improved testing apparatus.

In the illustrated embodiment of the invention, as seen in Fig. 1, the abrasion or wearing of samples of the materials to be tested is brought about by the action of a rotary disc 10 which has an abrasive surface 10a on one side and is carried on one end of a hollow driving shaft 11 supported in fixed bearings 30. The shaft 11 and disc 10 are rotated by suitable driving means. For example, a pulley 12 is fixed to the shaft and adapted to be connected through a V-belt with a driving motor (not shown).

Figure 2:
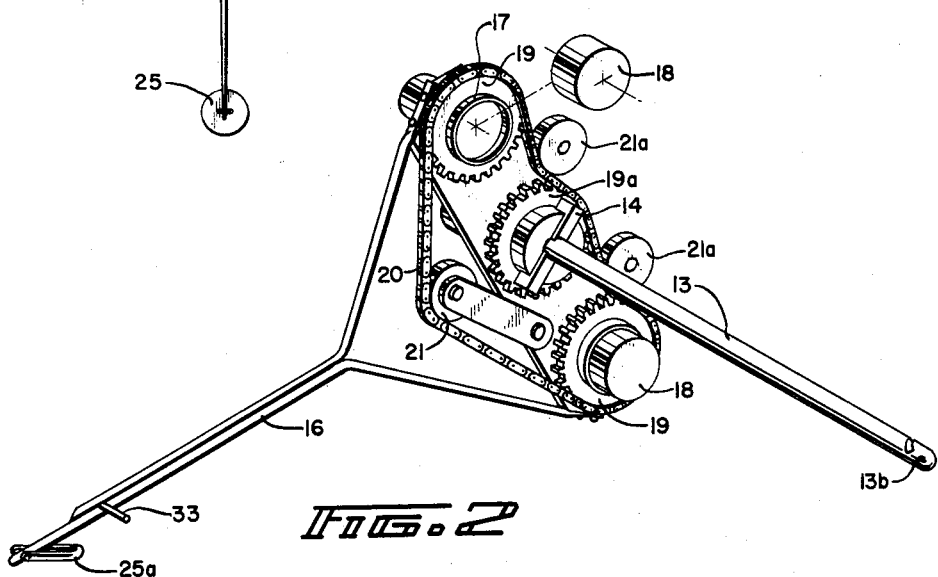
Fig. 2 is a perspective view of the sample holding support or lever and its supporting shaft, as they appear when removed from the assembly.

A sample support or bridge member 32 carries means for holding two samples or test pieces in confronting relation to the abrasive surface 10a of the rotary disc 10. The test pieces usually have a cylindrical form, as seen at 18 in Fig. 1 and Fig. 2. Each of them is fitted into a cylindrical cup 17 secured to a sprocket 19 which is mounted on the support 32 and is rotatable relative to the support on a spindle 22 held in anti-friction bearings.

The support 32 itself is pivotally mounted through anti-friction bearings on the forward end portion 13a of a rod or shaft 13 which extends both slidably and rotatably through the hollow shaft 11. At its backward end 13b, the rod or shaft 13 is linked through connector 41a, rotary coupling 41 and link 40 with the upper end 39 of a lever 37 (Fig. 4), which has its lower end fulcrumed at 38 and is connected between its ends with piston 35 of a fluid pressure cylinder 36. When a suitable fluid under pressure is admitted into cylinder 36 through supply line 42, the resulting pressure on piston 35 is translated through lever 37 and shaft 13 into a pulling force on support 32 which brings the test pieces 18 into working engagement with the abrasive surface 10a under a corresponding pressure.

Mounted on shaft 13 at the center of the support 32 is a driving sprocket 19a provided with a key 14 which fits slidably but non-rotatably into a retainer 15 secured at 15a to the hollow hub of the disc 10. An endless link chain 20 meshing with the teeth of sprocket 19a passes over the two sample-holding sprockets 19 in mesh with their teeth and is held in a suitably tightened position by idler rollers 21 and 21a mounted on support 32. When the shaft 13 and support 32 are in a working position relative to disc 10 and shaft 11, as seen in Fig. 1, the key 14 is engaged in retainer 15, and sprocket 19a therefore is rotated with and at the same angular velocity as the disc 10. The sprockets 19 has the same number of teeth as sprocket 19a.

It results that the test pieces 18 held in the cups 17 are roasted about their respective central axes during the rotation of disc 10, and at the same number of revolutions as the disc. By virtue of this manner of operation, every part of the wearing surface of each test piece is subjected to the same amount of wear or abrasion as every other part thereof, during a suitable period of abrasion of the test pieces.

Figure 3:
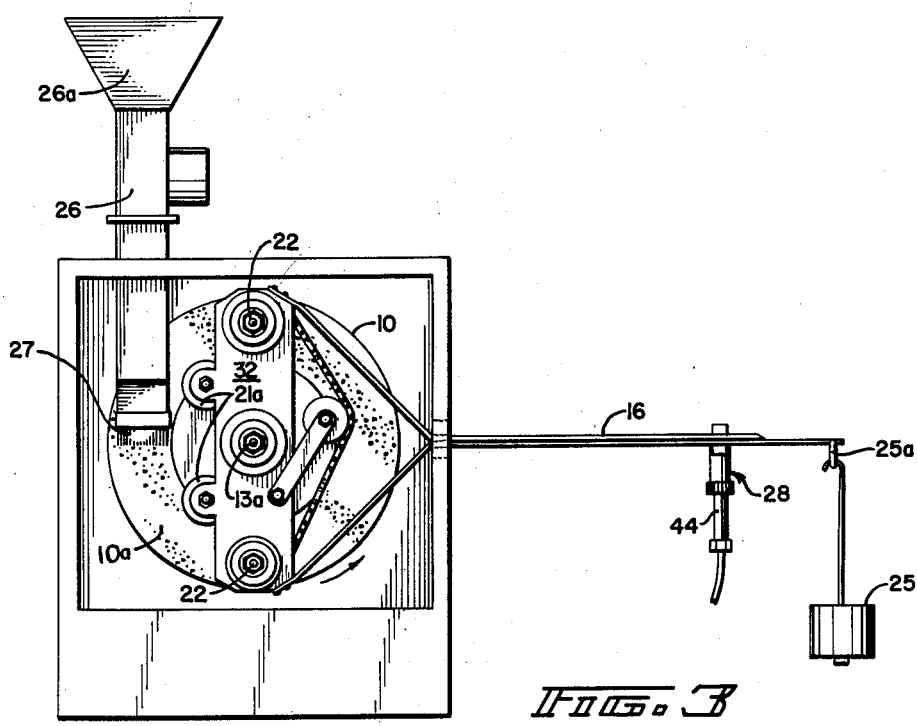
Fig. 3 is a front elevation of the machine.

In the course of the abrading operations, the disc 10 is rotated in a counterclockwise direction as viewed in Fig. 3, and its abrasive action on the test pieces tends to turn the test pieces and support 32 about the axis of the disc in the same direction. The resulting turning moment or torque on the support is transmitted to a lever arm 16 which is fixed to support 32 and extends horizontally from it to one side of the apparatus. The lever arm terminates at a free end on which a weight 25 is suspended by a link 25a. It is free to move vertically for a limited distance with angular movement of the support 32, but such movement in a counterclockwise direction is resisted by the predetermined load of the weight 25 acting on the lever arm 16. This load is given any desired magnitude by choosing a suitable weight.

It will be evident that the amount of work or power expended in the rotation of the abrasive surface 10a against the test pieces 18 during a given period of abrasion will be in direct proportion to the magnitude of the load applied to the lever arm 16, if the torque exerted on the lever arm 16 as a result of the abrading action is kept substantially in balance with that load during the test period. In the illustrated embodiment of the invention, the desired balance is maintained by regulating the fluid pressure in cylinder 36 (which governs the pressure of the test pieces against the abrasive surface) in response to angular displacements of the sample-holding support 32 and lever arm 16.

Figure 4:
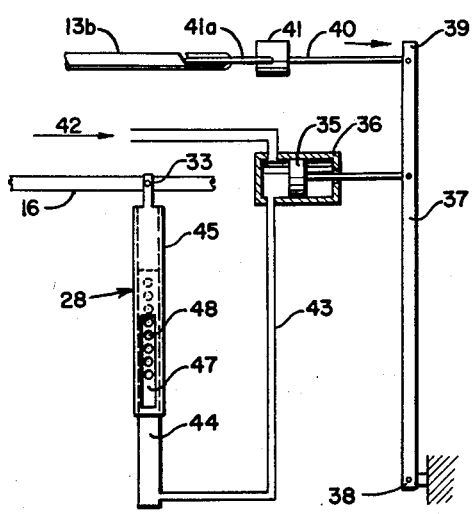
Fig. 4 is a diagrammatic view of the means provided for regulating the working pressure of the test pieces.

For this purpose, as seen in Fig. 4, the fluid pressure supply of cylinder 36 is connected through a bleeder duct 43 with an upright bleeder valve element 44 having a series of orifices 48 formed therein. A sleeve 45 fits slidably over element 44 so as to seal some of the orifices 48, but is formed with an opening 47 which exposes a smaller or larger number of these orifices to the atmosphere, depending upon the position of the sleeve. Sleeve 45 is connected with lever arm 16 so as to be changed in its position relative to element 44 by angular displacements of support 32 and arm 16.

Accordingly, when any condition of the abrading operations causes the torque on the test pieces to overbalance the predetermined load applied to the lever arm 16, the arm 16 and sleeve 45 will be displaced upwardly to expose a larger number of the pressure bleeding orifices 48 and thus reduce the pressure in cylinder 36, until the desired balance is restored. Whenever the torque is overbalanced by the predetermined load, a downward displacement of the sleeve occurs to seal more of the orifices, which increases the cylinder pressure until the desired balance is restored. In this way, the pressure of the samples against the rotating abrasive surfaces can be varied automatically so as to compensate for any changed condition of the testing operations and keep the rate of work of the machine at a substantially constant value determined by the magnitude of the load applied to the lever arm.

As shown in Fig. 3, the apparatus may be mounted on a housing with the disc 10 disposed vertically and the lever arm 16 extending horizontally through a vertically elongated slot in one side of the housing. In order to keep the abrasive surface 10a working uniformly and substantially clear of fragments of abraded material, an abrasive powder preferably is fed to the surface 10a in the course of the operations. For this purpose, a hopper 26a leads to chute 26 mounted on the housing, and the lower end of this chute feeds the powder by gravity to the rotating abrasive surface 10a as indicated at 27.

While a preferred embodiment of this invention has been described hereinabove and illustrated in the accompanying drawings, it will be evident that the new features of this invention may be embodied in other forms of apparatus within the scope of the appended claims.

I claim:

1. An apparatus for testing materials for wear resistance, comprising a disc having an abrasive surface, a sample support mounted for movement along and about the axis of said disc, means on said support for holding a sample of material to be tested in confronting relation to said surface, means for rotating said disc on said axis means for biasing said support toward said disc to press the sample against the abrasive surface, a lever arm extending from said support to receive a load opposing rotation of said support in the direction of rotation of said surface, a rotary mounting for said sample holding means, means for rotating said sample holding means simultaneously with the rotation of said disc, and means responsive to variations of the abrading torque of said surface against the sample for varying the action of said biasing means so as to keep the rate of work of said surface on the sample substantially constant.

2. An apparatus for testing materials for wear resistance, comprising a disc having an abrasvie surface, a sample support mounted for movement along and about the axis of said disc, means on said support for holding a sample of material to be tested in confronting relation to said surface, means for rotating said disc on said axis, means for biasing said support toward said disc to press the sample against the abrasive surface, a lever arm extending from said support to receive a load opposing rotation of said support in the direction of rotation of said surface, means mounting said sample holding means for rotation on an axis parallel to said disc axis, means for rotating said sample holding means simultaneously with the rotation of said disc at an angular velocity substantially the same as the angular velocity of said disc, and means responsive to variations of the abrading torque of said surface against the sample for varying the action of said biasing means so as to keep the rate of work of said surface on the sample substantially constant.

3. An apparatus for testing materials for wear resistance, comprising a disc having an abrasive surface, a sample support mounted for movement along and about the axis of said disc, means on said support for holding a sample of material to be tested in confronting relation to said surface, means for rotating said disc, means for biasing said support toward said disc to press the sample against the abrasive surface, a lever arm extending from said support to receive a load opposing rotation of said support in the direction of rotation of said surface, means mounting said sample holding means for rotation on an axis parallel to said disc axis, and sprocket and chain means including a driving sprocket releasably coupled with said disc for rotating said sample holding means simultaneously with and at the same number of revolutions as the rotation of said disc.

4. An apparatus for testing materials for wear resistance, comprising a disc having an abrasive surface, a sample support mounted for movement along and about the axis of said disc, means on said support for holding a sample of material to be tested in confronting relation to said surface, means for rotating said disc, means for biasing said support toward said disc to press the sample against the abrasive surface, a lever arm extending from said support to receive a load opposing rotation of said support in the direction of rotation of said surface, and means responsive to angular displacements of said support for regulating the force of said biasing means so as to keep the abrading torque on said support substantially balanced by said load.

5. An apparatus for testing materials for wear resistance, comprising a disc having an abrasive surface, a sample support mounted for movement along and about the axis of said disc, means on said support for holding a sample of material to be tested in confronting relation to said surface, means for rotating said disc, means for biasing said support toward said disc to press the sample against the abrasive surface, a lever arm extending from said support to receive a load opposing rotation of said support in the direction of rotation of said surface, means mounting said sample holding means for rotation on an axis parallel to said disc axis, means for rotating said sample holding means simultaneously with the rotation of said disc at an angular velocity substantially the same as the angular velocity of said disc, and means responsive to angular displacements of said support for regulating the force of said biasing means so as to keep the abrading torque on said support substantially balanced by said load.

6. An apparatus for testing materials for wear resistance, comprising a disc having an abrasive surface, a sample support mounted for movement along and about the axis of said disc, means on said support for holding a sample of material to be tested in confronting relation to said surface, means for rotating said disc, means for biasing said support toward said disc to press the sample against the abrasive surface, a lever arm extending from said support to receive a load opposing rotation of said support in the direction of rotation of said surface, and means responsive to angular displacements of said support for regulating the force of said biasing means so as to keep the abrading torque on said support substantially balanced by said load, said biasing means including a fluid pressure cylinder housing a piston connected with said support and said regulating means including a pressure bleeding valve connected with the fluid pressure supply of said cylinder and positioned by said lever arm.

References Cited in the file of this patent
UNITED STATES PATENTS

| | | |
|---|---|---|
| 1,624,290 | Taylor et al. | Apr. 12, 1927 |
| 1,711,866 | Williams | May 7, 1929 |
| 1,871,992 | Hevze | Aug. 16, 1932 |
| 2,266,305 | Boegehold et al. | Dec. 16, 1941 |
| 2,603,083 | Schiefer | July 15, 1952 |